United States Patent [19]
Brown et al.

[11] 3,923,623
[45] Dec. 2, 1975

[54] METHOD AND APPARATUS FOR USE IN CONJUNCTION WITH ELECTROPAINTING A LARGE NUMBER OF SMALL ARTICLES

[75] Inventors: Roy A. Brown; Franklin H. Guzzetta, both of Monroe, Ohio

[73] Assignee: Armco Steel Corporation, Middletown, Ohio

[22] Filed: Aug. 5, 1974

[21] Appl. No.: 494,988

Related U.S. Application Data
[63] Continuation of Ser. No. 354,938, April 27, 1973, abandoned.

[52] U.S. Cl. ............ 204/181; 204/300 EC; 209/247
[51] Int. Cl.²..C25D 13/06; B65G 49/02; B07B 4/02
[58] Field of Search ........ 204/181, 300 EC; 209/247

[56] References Cited
UNITED STATES PATENTS

| | | | |
|---|---|---|---|
| 1,897,902 | 2/1933 | Harsanyi | 204/181 |
| 2,661,575 | 12/1953 | Kennedy | 209/247 |
| 3,575,832 | 4/1971 | Johnson | 204/181 |
| 3,620,952 | 11/1971 | Chiappe | 204/300 |

*Primary Examiner*—Howard S. Williams
*Attorney, Agent, or Firm*—Melville, Strasser, Foster & Hoffman

[57] ABSTRACT

In electropainting a large number of small articles by the electrical deposition of an organic film from a suitable paint solution, the freshly coated articles tend to stick together. To overcome this, these freshly painted pieces may be first subjected to a fan shaped water jet cooperating with a slide whereby to effect an initial separation; this jet may also act to wash excess paint from the articles. A further separation of the articles from one another is effected by subjecting these now somewhat scattered articles to jets of air whereby to blow off the water and distribute these articles in such manner that they will fall through a final distribution device prior to falling onto the belt that conducts them through the curing oven. This insures that a minimum number of coated articles will be touching one another as they are passed through the baking oven.

25 Claims, 5 Drawing Figures

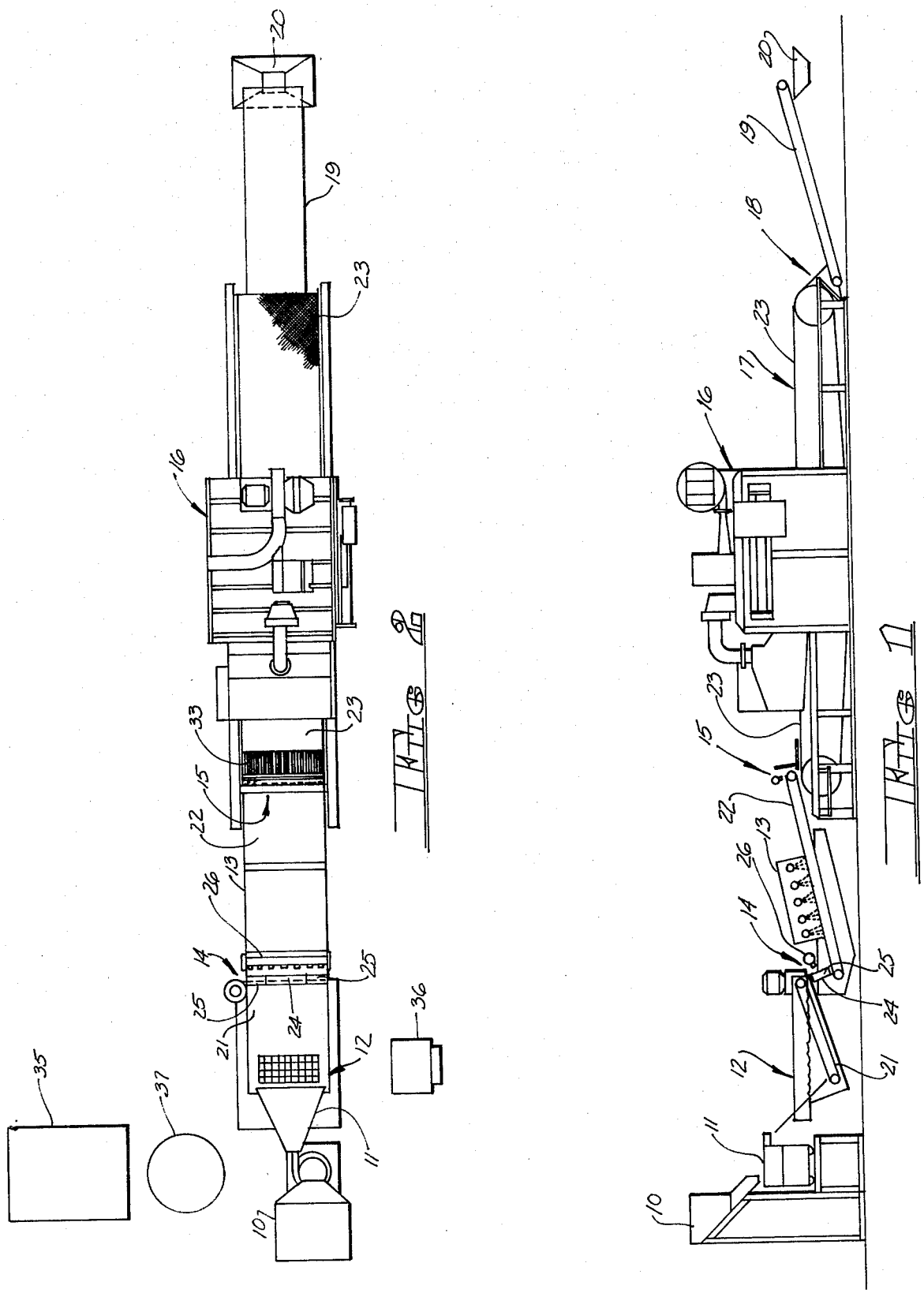

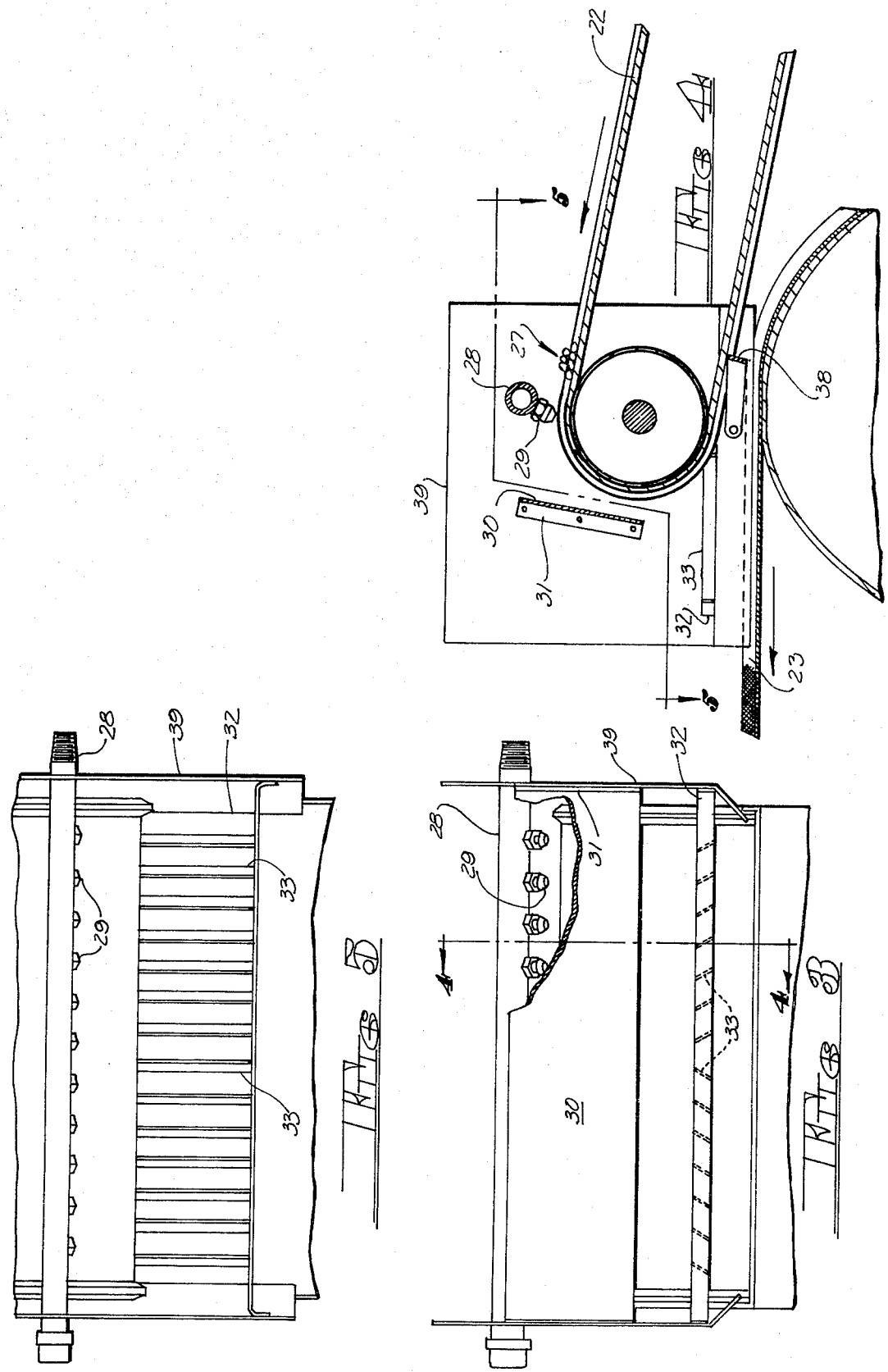

3,923,623

METHOD AND APPARATUS FOR USE IN CONJUNCTION WITH ELECTROPAINTING A LARGE NUMBER OF SMALL ARTICLES

CROSS REFERENCE TO RELATED APPLICATION

This is a continuation of application Ser. No. 354,938, filed Apr. 27, 1973, now abandoned.

BACKGROUND OF THE INVENTION

1. Field of the Invention

This invention relates generally to electropainting, usually the electrical deposition of an organic film from an aqueous paint solution simultaneously on a plurality of conductive articles in a suitable container. This invention has particular application to the electropainting of small articles such as rivet sleeves, screws, nuts, bolts, and other fasteners.

In electropainting, it is customary to provide a first electrode to give a designated charge to the articles and a second electrode to provide an opposite charge to the solution, whereby the resin and pigment components of the paint solution will migrate towards the article. Various electropainting methods have now been devised whereby good coatings are obtained on the articles. These coated articles, however, must be subjected to a further baking treatment and it is important that the articles have minimum, if any, contact one with another as they are subjected to such baking. It is to the problem of eliminating sticking-together of the freshly electropainted articles that this invention is directed.

2. Description of the Prior Art

No search of the United States patent art has been made directed to the specific invention which is the subject of this application. There are a number of issued patents relating to electropainting generally. Typical of these are U.S. Pat. No. 3,616,392 Haney, the patents cited therein, and Swedish Patents 322,390 and 308,049. Such electropainting may involve immersing the articles in an aqueous paint solution while in a conductive container and passing current through the container and solution to irreversibly deposit an organic coating on the articles. Various refinements have been made on this process such as, for example, the application of a conversion coating as taught in the said Haney U.S. Pat. No. 3,616,392. The art teaches generally the use of electrodes, an anode and a cathode, immersed in an electrocoating solution through which the articles to be painted are passed. While such patents as U.S. Pat. No. 3,682,136 Haney et al., and some of those cited therein, show various means for separating the articles during electropainting, the art appears largely silent on the importance of separating the freshly coated articles one from another between the time they leave the electropainting bath and the time they enter the final baking oven. This, however, is an important consideration and one which is taken care of by this invention.

SUMMARY OF THE INVENTION

This invention involves separating large numbers of freshly electropainted small articles one from another after electropainting and before final baking so as to drastically reduce the number of "paired" pieces heretofore realized. The invention includes a method and means for first distributing the large quantity of coated articles onto a belt which carries the articles from the paint basin through the washing station and onto a conveyor leading through the baking or curing oven. The painted articles rather densely cover the relatively narrow belt or grid on which they are supported during the painting operation and the initial task, therefore, is to spread them out over the next belt as they leave the paint basin. This may be accomplished by a fan shaped water jet and a plastic slide. Further separation, however, is necessary in order to avoid making "paired" pieces when the articles are distributed onto the oven conveyor for final curing. During such curing, any touching pieces will become stuck together. In order to insure that few such pieces do touch one another during the curing process, a second separation is achieved by a plurality of air jets which blows off the attached water and distributes the pieces in such manner that they may fall through a "Venetian blind" type of distribution device and onto the belt that conducts them through the curing oven. These closely related distributing methods and means complement one another so that the end result is a good distribution of a large number of small pieces on the curing oven conveyor such that the pieces do not stick to one another.

BRIEF DESCRIPTION OF THE DRAWINGS

FIG. 1 is a schematic showing of one electropainting system in which the instant invention may be incorporated, FIG. 2 is essentially a top plan view of the system illustrated in FIG. 1, FIG. 3 is a fragmentary view, with parts broken away, of a portion of the separating means, FIG. 4 is a sectional view taken on the line 4—4 of FIG. 3, and FIG. 5 is a fragmentary view taken along the line 5—5 of FIG. 4.

DESCRIPTION OF THE PREFERRED EMBODIMENTS

Referring first to FIG. 1, by way of background, a typical electropainting apparatus for the coating of a large number of small articles may include a hopper 10 for the feeding of the articles to be painted to some sort of means 11 for metering the articles into the paint bath; such metering means could, for example, comprise a vibratory bowl to help insure that the articles will enter the paint bath other than in a mass of stuck together material. The paint bath is generally indicated at 12.

The now electropainted articles may then proceed through a water spray booth 13 for rinsing excess paint from the freshly coated articles. Article separating means are generally indicated at 14 and 15 and are provided at the incoming and discharge ends respectively of the water spray booth. These means 14 and 15 incorporate the instant invention and will be described in greater detail shortly.

After the articles are conveyed through the electropainting paint bath and through the water spray bath, and having been subjected to the means 14 and 15 for separating the painted articles one from the other, such articles are then conveyed through a suitable oven 16 in which the now separated, electropainted articles are baked or cured at the proper temperature. As the baked, painted articles leave the oven 16, they may be cooled in the area 17 and either boxed at the area 18 or conveyed by suitable means 19 to another station 20 if such articles are to be further treated.

It will be understood that the foregoing general description of the method and apparatus illustrated in FIG. 1 is exemplary only; other general arrangements for electropainting are possible. It may be, for example, that the articles to be electropainted will be given one or more preliminary treatments before they enter the electropainting bath. One such treatment could be the application of a conversion coating, as taught in the said Haney U.S. Pat. No. 3,616,392, before the articles even reach the hopper 10. Other preliminary treatments may be accorded such articles prior to their entry into the electropainting bath and related apparatus. Other means of conveying the articles through the electropainting bath, such as the means shown in the said Haney et al., U.S. Pat. No. 3,682,136 may be employed. This invention, however, does not reside in the electropainting as such, and the preliminary treatments which may or may not accompany it; it is the distribution of the freshly electropainted articles, from the time they leave the paint bath until the time they enter the curing oven, to which this invention is directed. The method and means for achieving this desired distribution will now be explained.

In the typical electropainting setup depicted in FIG. 1, three "belts" are employed, namely, the moving grid 21 by which the articles to be electropainted are moved through the bath generally indicated at 12, a belt 22 onto which the freshly electropainted articles are deposited for movement thereby through the water spray booth 13, and an oven belt 23 which receives articles from the belt 22 and which delivers the articles through the oven 16 wherein they are properly cured or baked. Preferably the oven belt 23 extends beyond the oven 16, as indicated in the area 17, to allow for cooling of the articles as they leave the oven. Often these belts will vary in width, usually from a relatively narrow grid 21 to wider belts 22 and 23.

Coating belt or grid 21 must be fabricated from materials compatible with the paint solution employed and the articles being painted as will be understood by those skilled in the art. Belt 22, although sometimes made of rubber, could also be fabricated from a metal mesh, synthetic fibers or other suitable material. The oven conveyor or belt 23, again depending somewhat on the nature of the painting materials used, must be fabricated from material which will resist high curing temperatures, temperatures usually in excess of 700°F. It has been found that steel mesh meets this requirement nicely.

The grid 21 is arranged so that the articles deposited thereon are moved upwardly from left to right as viewed in FIG. 1, and this grid is so disposed with respect to the belt 22 that the articles falling off the grid 21 would normally fall onto the left hand end of the belt 22, also as viewed in FIG. 1. It is at this point that the first separation means, generally indicated at 14, are arranged. Such means comprises a slide or backstop 24 so located with respect to the grid 21 that articles moved through and from the bath 12 will fall thereupon. The slide 24 has a pair of side members 25 to guide the freshly electropainted articles towards the belt 22. Suitable frame means, not shown, are provided for holding the members 24, 25 in this position. A fan shaped water jet 26 is located so as to direct water under pressure against the articles as they leave the grid 21 and start down the slide and sideboard arrangement 24, 25. The painted articles may be rather densely disposed on the grid 21 during the electropainting operation and the initial task, therefore, is to spread them out over the conveyor 22 by which they will be moved through the water spray booth 13. This initial separation is achieved by the fan shaped water jet 26 acting in cooperation with the slide 24 and sideboards 25.

The fan shaped water jet 26, as indicated, acts as the first article separating means. When, however, there is a low density (small number) of articles being coated, this V-nozzle jet 26 also acts to wash excess paint from the articles as they leave the paint bath. In fact, under such conditions, the use of this jet 26 may actually eliminate the need for the spray booth 13.

The now somewhat separated, freshly electropainted articles which have been deposited on the belt 22 are thereby led through the water spray booth 13, if used, which may be arranged as desired. In a typical arrangement the booth 13 will be comprised of two sections, the first subjecting the painted articles to a tap water spray and the second thereafter subjecting such articles to a fine spray of de-ionized water. As just indicated, however, when relatively few articles are coming from the grid 21, the spray booth 13 may be eliminated entirely. And, although preferred, even when the booth 13 is utilized, it is not always necessary to use any de-ionized water.

In any event, when depositing the articles from the belt 22 onto the oven belt 23, it is necessary to avoid making "paired" pieces. During curing, touching pieces will become stuck together. In order to avoid this it is necessary to distribute the painted pieces onto the oven belt in a manner such that few pieces, preferably none, touch one another during the curing process. The means for accomplishing this is generally indicated at 15 and will now be described with reference to FIGS. 1 and 3 through 5.

The articles, generally indicated at 27 in FIG. 4, which have now been electropainted and water rinsed, and subjected to initial separation as deposited on the belt 22 via the means 24-26, are moved to the vicinity of the oven belt 23. The belts 22 and 23 are so disposed with respect to one another that as the articles 27 fall off the end of the belt 22 they will drop onto the oven belt 23. It is at this point that there is provided a two-stage separation of the articles as they are deposited on the belt 23.

The first stage of the article separation effected by the means generally indicated at 15 in FIG. 1 is achieved by a compressed air fan arrangement 28 having a plurality of air jet nozzles 29 which are directed towards the articles 27 at about that point wherein they would normally fall from the belt 22 towards the oven belt 23. The compressed air issuing from these jets 29 and directed towards the articles 27 acts to blow off water attached to such articles and it prevents the articles from sticking to the belt 22. A bank board 30 having sides 31 prevents the articles from flying off into the middle of the furnace where the paint coating would be cured improperly. It will be understood that the members 28–31 will be held in the relative positions shown in FIG. 4 by any suitable frame means known in the art but not specifically shown in the Figures.

Separation of the articles by means of the air jets 29, particularly the loosening of the articles from the belt 22, along with elimination of attached water, serves to prepare the articles for entrance to the oven. Although this first stage separation in the area 15 is quite effective, it has been found desirable to employ a second stage separation at this point in order to achieve that degree of final separation which has been found necessary for proper distribution of the articles 27 on the oven belt 23.

This second stage separation comprises a Venetian blind arrangement including a louver-like member 32 having a series of slanted slats 33, some slanted in one direction and some in the other as best seen in FIGS. 3 and 5. The slats 33 are elongated and parallel the direction of the travel of belt 23. The slatted louver 32, 33 is disposed below the conveyor belt 22 and bank board arrangement 30, 31 so as to receive articles falling therefrom. The slots 33 are separated one from another sufficient to permit the articles 27 to fall thereby onto the oven belt 23. In this manner the articles 27 are finally spread throughout the full width of the oven belt 23 with very few, if any, touching one another. As with the members 28–31, so are the members 32, 33 properly positioned with respect to the oven belt 23 by means of suitable framework, not shown.

It will be understood that the water spray booth 13, when used, and fan shaped water jet means 26 will be supplied from suitable sources not shown but which will be well understood by those skilled in the art. Similarly a source of compressed air, also not shown, will be suitably connected to the compressed air fan arrangement 28, 29. Details of the oven 16 are not described but will be understood by those skilled in the art as suitable to achieve that curing or baking which is required for the particular electropainting bath components employed and articles so coated.

In the typical electropainting arrangement generally shown in FIG. 2, a de-ionized water producing unit as indicated at 35, a power source for the electrocoating bath as indicated at 36, and an electrocoating paint reservior as indicated at 37, are employed. Also, as shown in FIG. 4, a blade 38 is arranged to push against the conveyor belt 22 in order to insure that none of the articles 27 sticks to the belt 22 whereby all of such articles are transferred to the oven belt 23. Side baffle sheets such as that indicated at 39 insure that all of the articles stay on the respective conveyors.

Suitable means, not shown but such as are well understood in the art, are provided for driving the grid 21, the conveyor belt 22, and the oven belt 23. In some instances, at least, improved results may be obtained by moving the members 21, 22 and 23 at progressively faster speeds, that is, conveyor belt 22 will move the articles faster than did the grid 21, and oven belt 23 will move the articles faster than did the conveyor belt 22.

In summary, therefore, it will be observed that the separating method of this invention employs two fluid distributing methods which complement one another and which work in conjunction with a louvered distributing means by virtue of all of which a good distribution of small articles on the curing oven conveyor 23 is achieved in such manner that the articles do not stick to one another during curing. The first fluid distributing means comprises the fan shaped water jet 26 acting on the articles 27 as they come from the moving grid 21 by which they were moved through and out of the electropainting bath. The second fluid separating means is comprised of the air manifold 28 provided with the nozzles 29 by which the articles 27 are further separated as they are loosened from the belt 22, whereafter they fall through the louvered grid 32, 33 onto the woven wire mesh oven belt 23; final separation is achieved by this louvered grid arrangement.

Not only does the water jet arrangement 26 effect an initial distribution of the articles 27 as they come from the electropainting bath 12, but in some instances it eliminates the need of further rinsing. Similarly, not only does the air manifold 28 effect a further distribution of the articles, but this air blast also loosens "tacky" parts coming out of the wet rinse on conveyor belt 22 whereby, for example, some clusters of perhaps two or three parts will be broken apart. And, of course, the louvered grid 32, 33 aids in distributing the articles uniformly across the oven belt 23. By virtue of all of this, the complete system prevents electropainted articles from adhering to one another during curing whereby useless scrapping of painted articles is avoided.

It will be apparent to those skilled in the art that modifications may be made in the method and means of this invention without departing from the scope and spirit thereof. Such method and means have been described in connection with particular structures and manipulations but it is to be understood that the claims are not to be limited to such structures and manipulations except insofar as they are specifically included therein.

The embodiments of the invention in which an exclusive property or privilege is claimed are defined as follows:

1. In a method for electropainting a large number of small articles and including a moving grid for moving the articles through and out of an electropainting bath and onto a conveyor belt for moving the articles through a water rinse station whereafter the articles are deposited on an oven belt to take them through a curing oven, that method of separating the articles from one another between the electropainting bath and the curing oven which comprises the steps of: effecting a first separation of the articles by subjecting them to a water blast as they fall from said grid onto said conveyor belt; effecting a second separation of the articles by subjecting them to an air blast as they fall from said conveyor belt towards said oven belt; and effecting a third separation of the articles by passing them through a louvered grid as they continue their fall from said conveyor belt onto said oven belt; by virtue of all of which a maximum distribution of the articles on said oven belt is achieved with a minimum of paired pieces.

2. The method of claim 1 in which, during said first separation, said water blast knocks said articles against a slide extending from said grid towards said conveyor belt.

3. The method of claim 1 in which, during said second separation by said air blast, said articles are loosened from said conveyor belt and prevented from flying into said oven.

4. The method of claim 1 in which, during said first separation, said water blast knocks said articles against a slide extending from said grid towards said conveyor belt and, during said second separation, said air blast loosens said articles from said conveyor belt and said loosened articles are directed towards said louvered grid and prevented from flying into said oven.

5. The method of claim 4 including the step of scraping any articles remaining on said conveyor belt, after said second separation, onto said oven belt.

6. The method of claim 1 including the steps of moving said grid at a certain speed, moving said conveyor belt faster than said grid, and moving said oven belt faster than said conveyor belt.

7. A method of separating a large number of massed small articles from one another which includes the steps of subjecting them first to a water blast, then to an air blast, and then dropping them onto a louvered grid.

8. In apparatus for simultaneously electropainting a large number of small articles and including an electropainting bath, a moving grid for transporting the articles through and out of the said bath, a conveyor belt to receive articles from said grid, an oven belt to receive articles from said conveyor belt, and an oven through which the articles are moved by said oven belt, the improvement which comprises: first separating means including water blast means to spray said articles with pressurized water as they fall from said moving grid onto said conveyor belt; second separating means including air blast means to subject said articles to pressurized air as they fall from said conveyor belt towards said oven belt; and third separating means including a louvered grid through which said articles fall as they continue their movement onto said oven belt.

9. The apparatus of claim 8 in which said first separating means includes a slide extending from said grid towards said conveyor belt and against which slide said articles are driven by said water blast means.

10. The apparatus of claim 8 in which said second separating means includes a deflector extending from said conveyor belt towards said louvered grid so as to direct said articles to said louvered grid and to keep said articles from flying into said oven.

11. The apparatus of claim 8 in which said louvered grid includes a plurality of elongated slats extending parallel to said conveyor belt, some of said slats being tilted in one direction and others of said slats being tilted in an opposite direction.

12. The apparatus of claim 8 including means to move said grid at a certain speed, means to move said conveyor belt faster than said grid, and means to move said oven belt faster than said conveyor belt.

13. The apparatus of claim 8 including a water rinse station through which the articles are moved by said conveyor belt, said station being located between said bath and said oven.

14. The apparatus of claim 8 in which said first separating means includes a slide extending from said grid towards said conveyor belt and against which slide said articles are driven by said water blast means; in which said second separating means includes a deflector extending from said conveyor belt towards said louvered grid so as to direct said articles to said louvered grid and to keep said articles from flying into said oven; and in which said louvered grid includes a plurality of elongated slats extending parallel to said conveyor belt, some of said slats being tilted in one direction and others of said slats being tilted in an opposite direction.

15. The apparatus of claim 14 including a scraper blade positioned adjacent said conveyor belt to scrape any of said articles therefrom which may have stuck thereto rather than fall therefrom towards said oven belt.

16. In a method for electropainting a large number of small articles and including a moving grid for moving the articles through and out of an electropainting bath and onto a conveyor belt for moving the articles through a water rinse station whereafter the articles are deposited on an oven belt to take them through a curing oven, that method of separating the articles from one another between the electropainting bath and the curing oven which comprises the steps of: effecting a first separation of the articles by subjecting them to a fluid blast as they move from said grid towards said oven belt; and effecting a further separation of the articles by passing them through a louvered grid as they continue movement from said grid towards said oven belt; by virtue of all of which a good distribution of the articles on said oven belt is achieved with a minimum of paired pieces.

17. The method of claim 16 in which said fluid blast is a water blast.

18. The method of claim 17 in which said water blast is administered to said articles as they fall from said grid towards said conveyor belt.

19. The method of claim 16 in which said fluid blast is an air blast.

20. The method of claim 19 in which said air blast is administered to said articles as they fall from said conveyor belt towards said oven belt.

21. In apparatus for simultaneously electropainting a large number of small articles and including an electropainting bath, a moving grid for transporting the articles through and out of the said bath, a conveyor belt to receive articles from said grid, an oven belt to receive articles from said conveyor belt, and an oven through which the articles are moved by said oven belt, the improvement which comprises: first separating means including fluid blast means administered to said articles as they move from said moving grid towards said oven belt; and further separating means including a louvered grid through which said articles fall as they continue their movement towards said oven belt.

22. The apparatus of claim 21 in which said fluid blast means is a water blast means.

23. The apparatus of claim 22 in which said water blast means sprays said articles with pressurized water as they fall from said moving grid towards said conveyor belt.

24. The apparatus of claim 21 in which said fluid blast means is an air blast means.

25. The apparatus of claim 24 in which said air blast means subjects said articles to pressurized air as they fall from said conveyor belt towards said oven belt.

* * * * *